(12) United States Patent
Lim et al.

(10) Patent No.: US 6,278,954 B1
(45) Date of Patent: Aug. 21, 2001

(54) METHOD AND APPARATUS FOR ESTIMATING GENERATED ENERGY OF SOLAR CELL

(75) Inventors: Chin Chou Lim, Kyotanabe; Masanari Tamechika, Nara; Nobuyoshi Takehara, Soraku-gun, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/090,691

(22) Filed: Jun. 4, 1998

(30) Foreign Application Priority Data

Jun. 5, 1997 (JP) .................................................. 9-147797
May 25, 1998 (JP) ................................................ 10-143168

(51) Int. Cl.[7] .................................................. H01M 10/42
(52) U.S. Cl. ................................ 702/99; 702/65; 702/63; 320/101; 323/906
(58) Field of Search .................................... 136/246, 249, 136/256; 702/60, 64, 65, 99, 63; 320/101; 323/906

(56) References Cited

U.S. PATENT DOCUMENTS 5,688,337 * 11/1997 Mosher ................................ 136/244
5,867,011 * 2/1999 Jo et al. ............................... 323/299

FOREIGN PATENT DOCUMENTS 8-36433    2/1996 (JP) .

OTHER PUBLICATIONS

Kleiss et al., "Temperature–Dependent Influence of a Si:H Cell Degradation on the Energy Delivered under Realistic Operating Conditions", IEEE, Jan. 1993.*
Knaupp, "Power Rating of Photovoltaic Modules From Outdoor Measurements", IEEE, Aug. 1991.*
Nann et al., "A Numerical Analysis of PV–Rating Methods", IEEE, Aug. 1991.*
Hussein et al., "Maximum Photovoltaic Power Tracking: an Algorithm for rapidly Changing Atmospheric Conditions", IEEE, Jan. 1995.*
Krauter et al., "Actual Optical and Thermal Performance of PV–Modules", IEEE, Apr. 1994.*
Fukae et al., "Outdoor Performance of Triple Stacked a–Si Photovoltaic Module in Various Geographical Locations and Climates", IEEE, Apr. 1996.*
B. Kroposki, "A Comparison of Photovoltaic Module Performance Evaluation Methodologies for Energy Ratings", 1994 1st World Conf. on Photovoltaic Energy Conversion, vol. 1, Dec. 1994, pp. 858–862.
"Guidebook for Design of Photovoltaic Power Generation System", OHM–sha, Ltd. pp. 42–68 (1994).

* cited by examiner

Primary Examiner—Patrick Assouad
(74) Attorney, Agent, or Firm—Fitzpatrick, Cella, Harper & Scinto

(57) ABSTRACT

The temperature correction coefficient in a formula for estimating the generated energy of a solar cell is corrected in the negative direction as the mean monthly ambient temperature increases. For an amorphous silicon solar cell, the generated energy is expected to be smaller than the actually generated energy. To prevent this, a correction coefficient which increases as the mean monthly ambient temperature becomes high is calculated on the basis of the mean monthly temperature at the solar cell installation site. The generated energy is estimated from the mean solar radiation at the installation site, the calculated correction coefficient, and the rated power of the solar cell. With this arrangement, the generated energy of an amorphous silicon solar cell or a photovoltaic power generation apparatus can be more accurately estimated on the basis of the installation site.

22 Claims, 16 Drawing Sheets

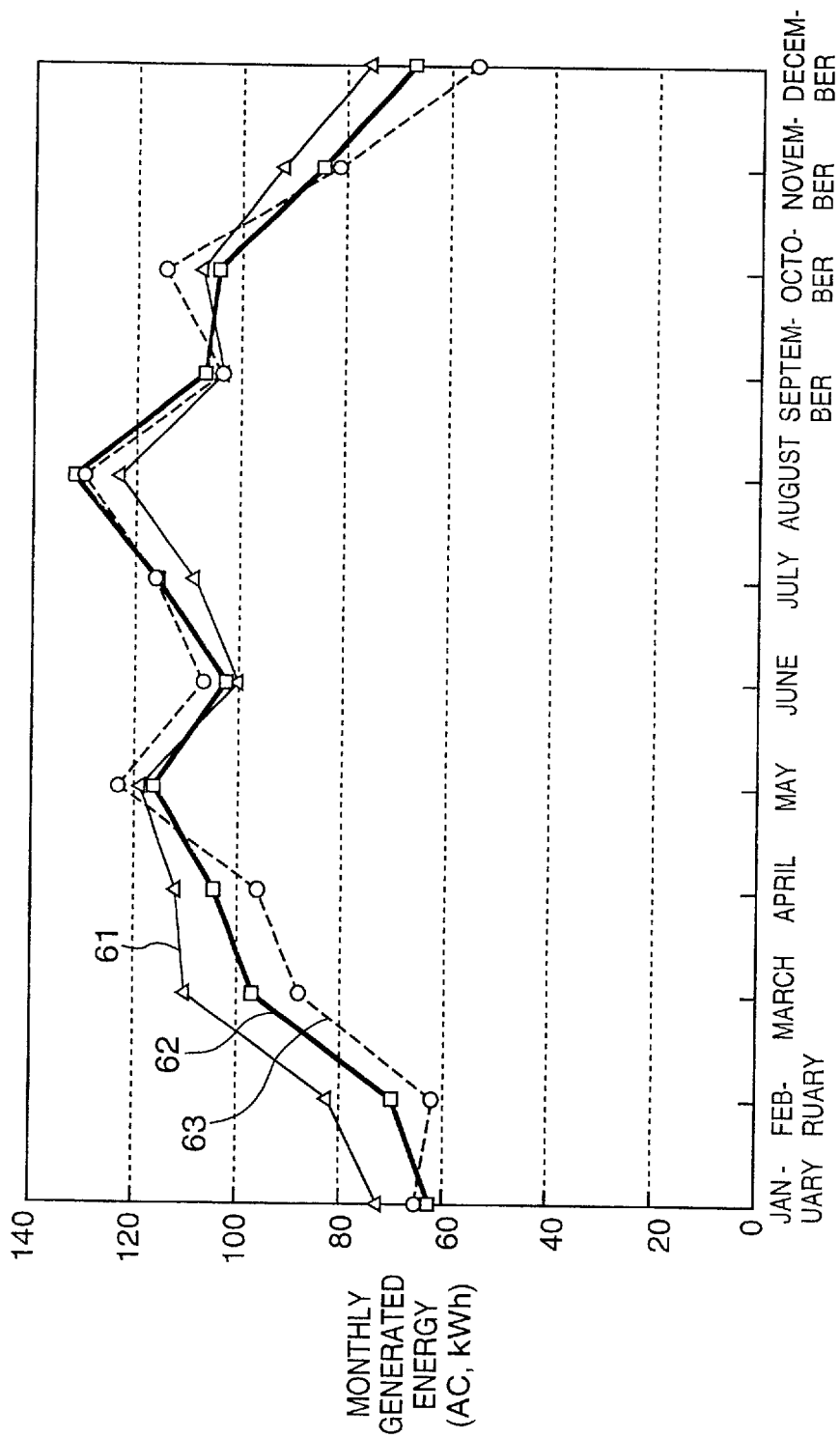

FIG. 6B

| MONTH | MEAN MONTHLY AMBIENT TEMPERATURE A1 (°C, NORMAL VALUE) | MEAN TILT SURFACE SOLAR RADIATION IS1 (kWh/m²/DAY, NORMAL VALUE) | ACTUALLY MEASURED SOLAR RADIATION (kWh/m²/DAY) | GENERATED ENERGY ACCORDING TO CONVENTIONAL FORMULA (AC, kWh) | GENERATED ENERGY ACCORDING TO FORMULA OF PRESENT INVENTION (AC, kWh) | ACTUALLY MEASURED ENERGY (AC, kWh) |
|---|---|---|---|---|---|---|
| JANUARY | 3.0 | 2.690 | 3.000 | 73.3 | 62.4 | 65.5 |
| FEBRUARY | 3.2 | 3.340 | 3.330 | 82.2 | 70.0 | 61.6 |
| MARCH | 6.0 | 4.060 | 3.990 | 110.0 | 96.6 | 88.6 |
| APRIL | 11.4 | 4.350 | 4.230 | 112.9 | 104.7 | 96.0 |
| MAY | 16.4 | 4.510 | 4.670 | 119.7 | 116.7 | 122.7 |
| JUNE | 20.7 | 3.940 | 3.930 | 100.3 | 102.0 | 106.2 |
| JULY | 25.1 | 4.190 | 4.182 | 109.3 | 115.8 | 116.3 |
| AUGUST | 26.4 | 4.750 | 4.790 | 123.5 | 132.5 | 130.5 |
| SEPTEMBER | 22.3 | 4.060 | 4.083 | 103.1 | 106.4 | 103.1 |
| OCTOBER | 16.1 | 4.030 | 4.474 | 107.0 | 104.1 | 114.7 |
| NOVEMBER | 10.7 | 3.520 | 3.535 | 91.5 | 84.2 | 81.8 |
| DECEMBER | 5.7 | 2.800 | 2.420 | 75.9 | 66.4 | 55.0 |

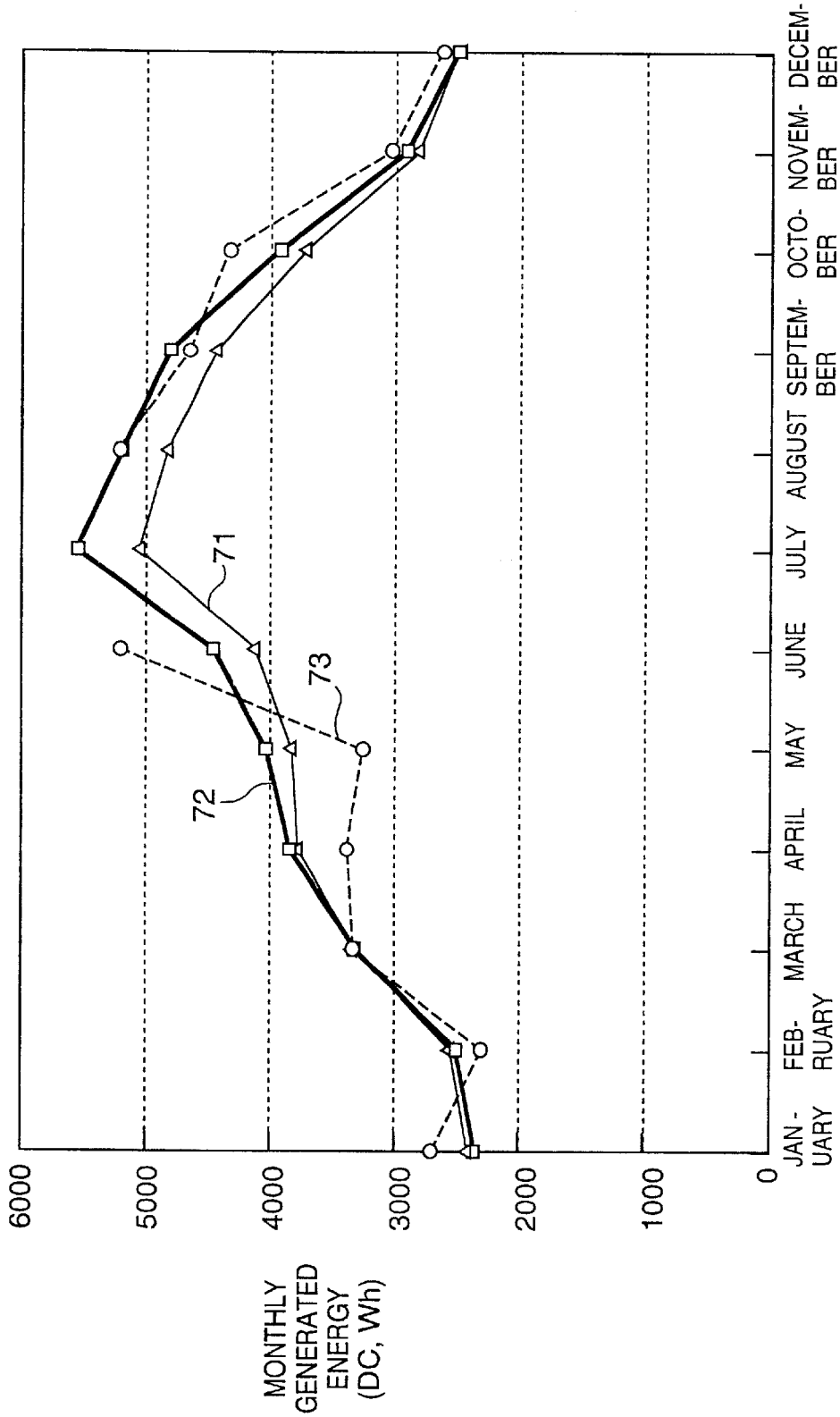

FIG. 7B

| MONTH | MEAN MONTHLY AMBIENT TEMPERATURE A1 (°C, NORMAL VALUE) | MEAN TILT SURFACE SOLAR RADIATION IS1 (kWh/m²/DAY, NORMAL VALUE) | ACTUALLY MEASURED SOLAR RADIATION (kWh/m²/DAY) | GENERATED ENERGY ACCORDING TO CONVENTIONAL FORMULA (DC, Wh) | GENERATED ENERGY ACCORDING TO FORMULA OF PRESENT INVENTION (DC, Wh) | ACTUALLY MEASURED ENERGY (DC, Wh) |
|---|---|---|---|---|---|---|
| JANUARY | 16.0 | 2.690 | 3.089 | 2426 | 2391 | 2701 |
| FEBRUARY | 16.3 | 3.170 | 2.775 | 2581 | 2549 | 2320 |
| MARCH | 18.1 | 3.690 | 3.886 | 3314 | 3321 | 3363 |
| APRIL | 21.1 | 4.390 | 3.810 | 3792 | 3892 | 3381 |
| MAY | 23.8 | 4.310 | 3.491 | 3826 | 4011 | 3294 |
| JUNE | 26.2 | 4.850 | 5.703 | 4146 | 4429 | 5214 |
| JULY | 28.3 | 5.800 | — | 5101 | 5539 | — |
| AUGUST | 28.1 | 5.480 | 5.435 | 4822 | 5227 | 5232 |
| SEPTEMBER | 27.2 | 5.230 | 5.128 | 4462 | 4803 | 4683 |
| OCTOBER | 24.5 | 4.230 | 4.849 | 3750 | 3953 | 4364 |
| NOVEMBER | 21.4 | 3.270 | 3.591 | 2823 | 2904 | 3053 |
| DECEMBER | 18.0 | 2.810 | 3.100 | 2524 | 2528 | 2665 |

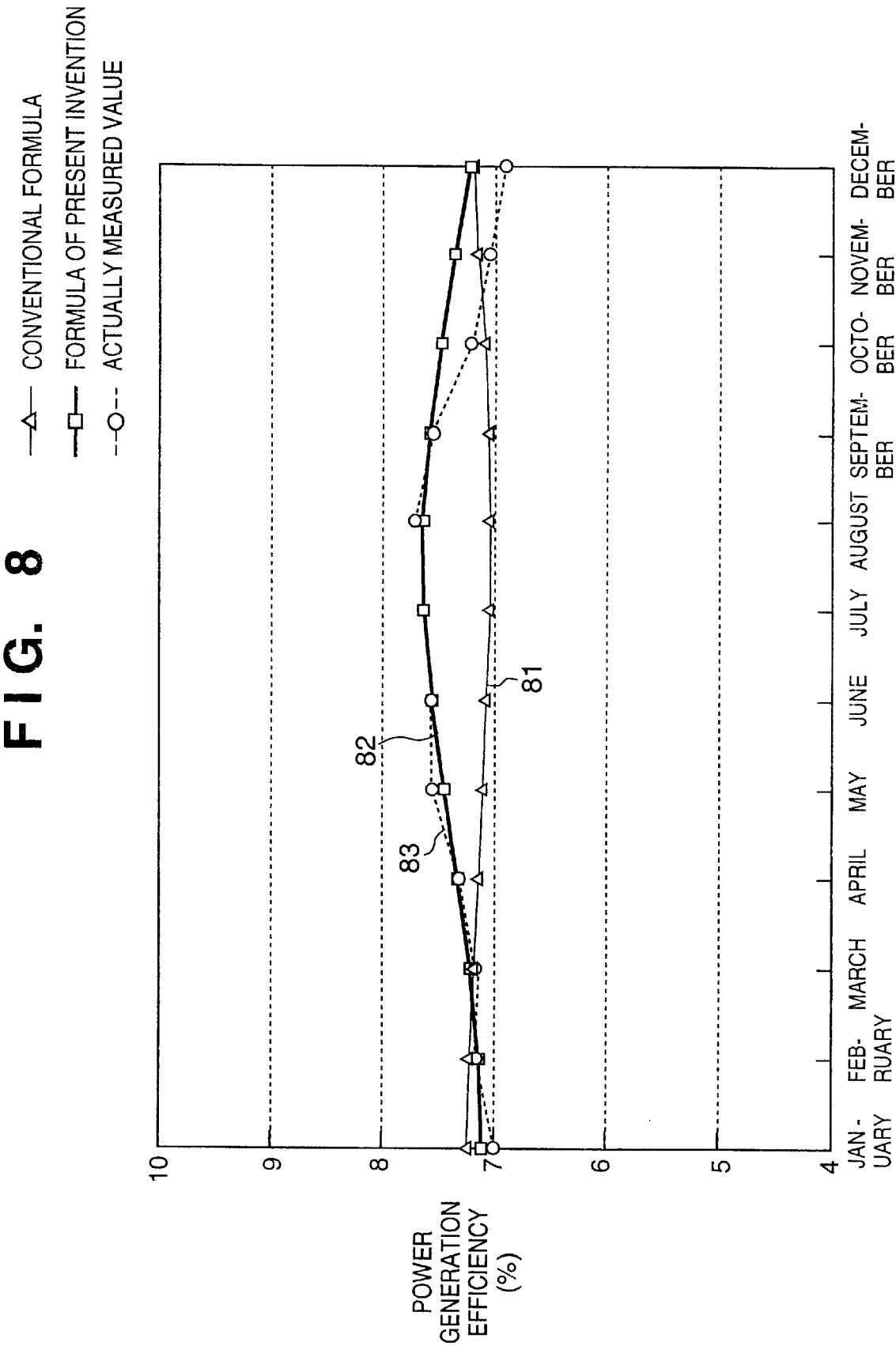

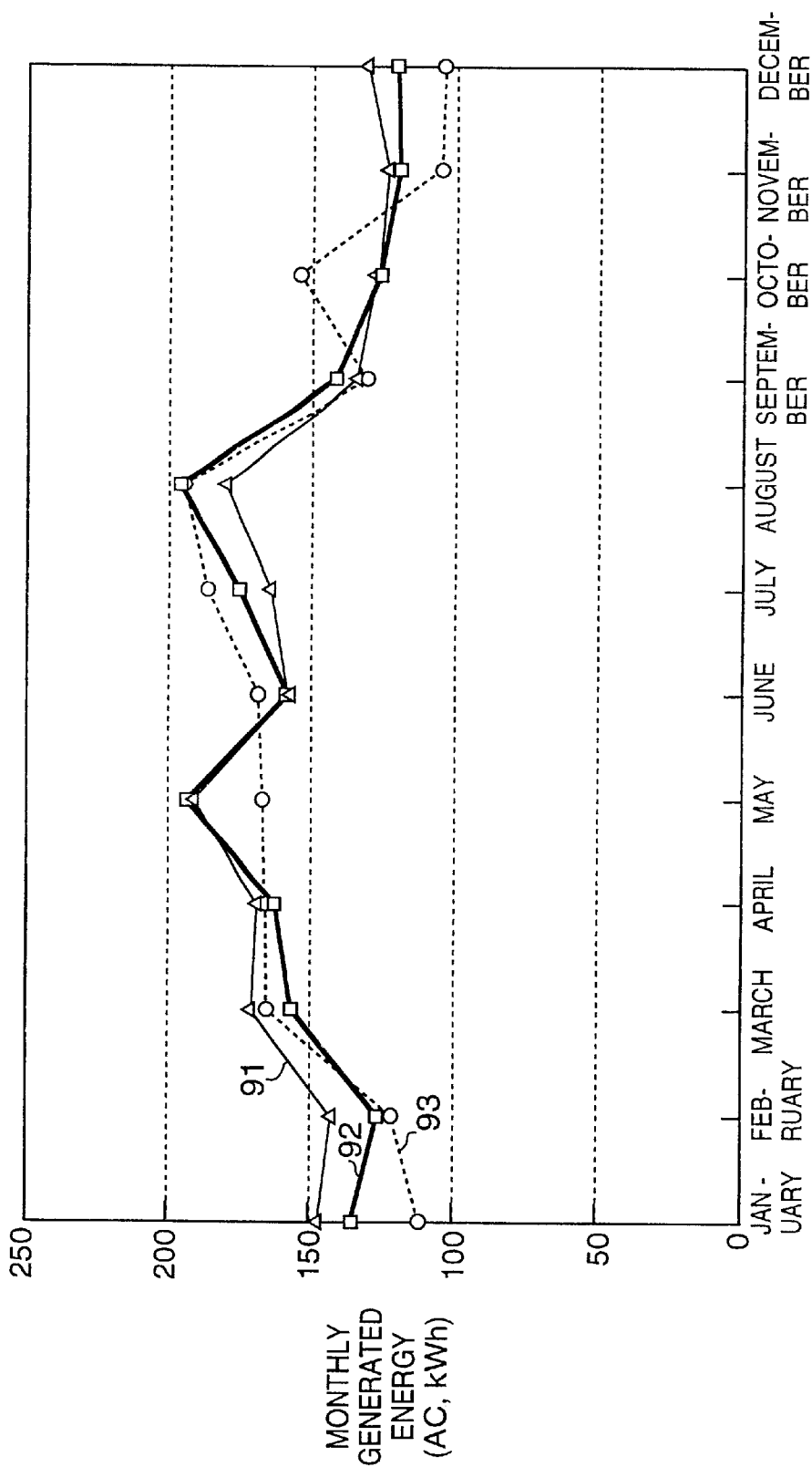

FIG. 9B

| MONTH | MEAN MONTHLY AMBIENT TEMPERATURE A1 (°C) | MEAN TILT SURFACE SOLAR RADIATION IS1 (kWh/m²/DAY, NORMAL VALUE) | GENERATED ENERGY ACCORDING TO CONVENTIONAL FORMULA (AC, kWh) | GENERATED ENERGY ACCORDING TO FORMULA OF PRESENT INVENTION (AC, kWh) | ACTUALLY MEASURED ENERGY (AC, kWh) |
|---|---|---|---|---|---|
| JANUARY | 5.2 | 3.590 | 149.8 | 135.0 | 111.8 |
| FEBRUARY | 5.6 | 3.750 | 141.2 | 127.7 | 121.8 |
| MARCH | 8.5 | 4.120 | 170.8 | 158.2 | 160.6 |
| APRIL | 14.1 | 4.280 | 169.8 | 164.7 | 166.3 |
| MAY | 18.6 | 4.690 | 190.5 | 191.7 | 167.6 |
| JUNE | 21.7 | 3.940 | 153.9 | 158.7 | 169.1 |
| JULY | 25.2 | 4.120 | 165.1 | 175.0 | 186.8 |
| AUGUST | 27.1 | 4.510 | 180.0 | 193.7 | 193.2 |
| SEPTEMBER | 23.2 | 3.490 | 135.9 | 141.8 | 132.0 |
| OCTOBER | 17.6 | 3.170 | 129.0 | 128.8 | 153.0 |
| NOVEMBER | 12.6 | 3.150 | 125.3 | 120.1 | 106.7 |
| DECEMBER | 7.9 | 3.190 | 132.4 | 122.0 | 103.0 |

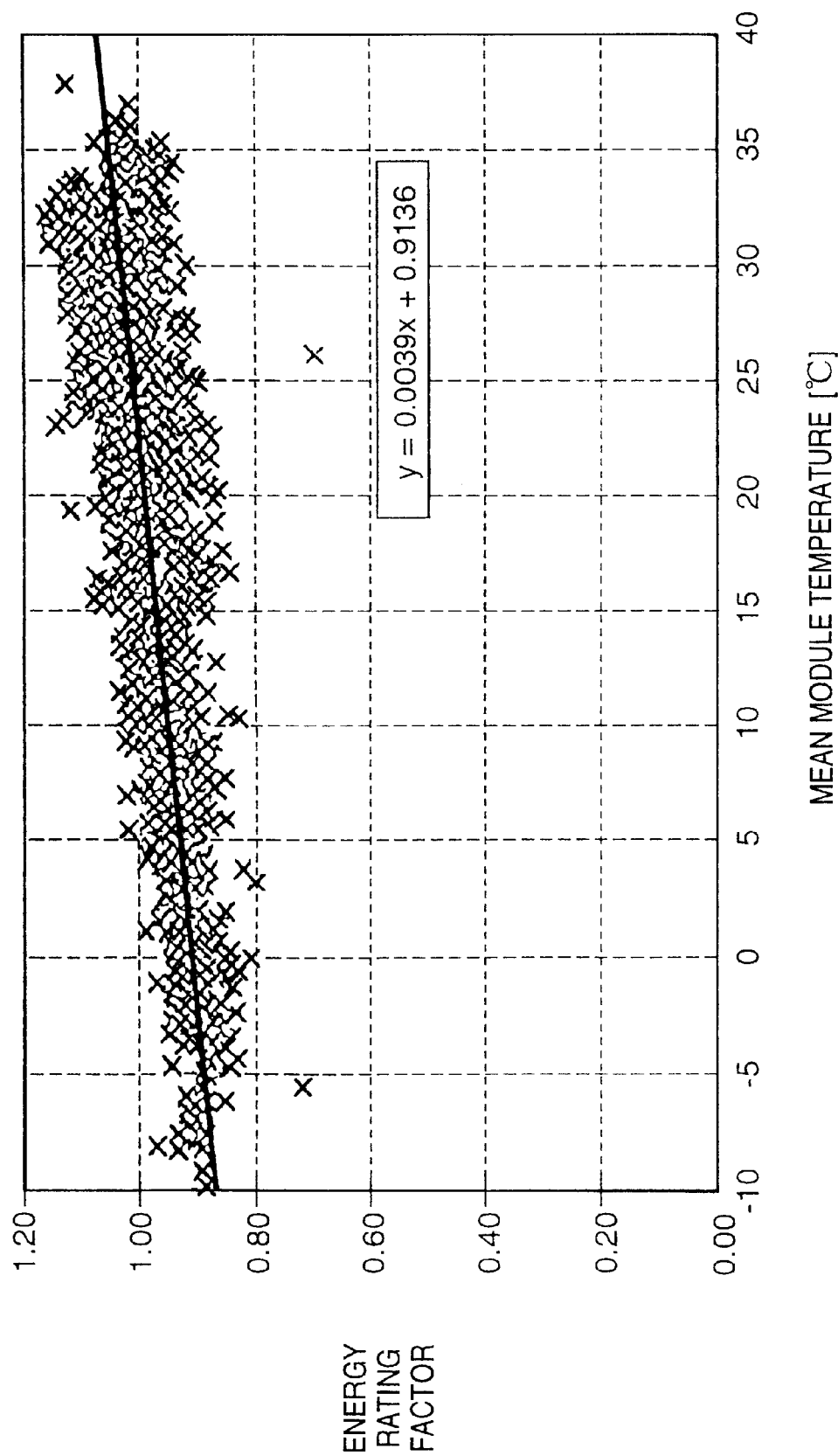

FIG. 12B

| MONTH | MEAN MONTHLY MODULE TEMPERATURE B1 (°C) | MEAN TILT SURFACE SOLAR RADIATION IS1 (kWh/m²/DAY, NORMAL VALUE) | ACTUALLY MEASURED SOLAR RADIATION (kWh/m²/DAY) | GENERATED ENERGY ACCORDING TO FORMULA OF PRESENT INVENTION (DC, Wh) | ACTUALLY MEASURED ENERGY (DC, Wh) |
|---|---|---|---|---|---|
| JANUARY | 5.1 | 2.870 | 3.042 | 2366 | 2363 |
| FEBRUARY | 7.4 | 3.310 | 3.389 | 2489 | 2541 |
| MARCH | 10.7 | 4.060 | 4.027 | 3426 | 3418 |
| APRIL | 16.6 | 4.470 | 4.675 | 3739 | 3730 |
| MAY | 22.1 | 4.690 | 4.574 | 4142 | 3908 |
| JUNE | 26.1 | 4.090 | 4.278 | 3550 | 3566 |
| JULY | 30.8 | 4.430 | 4.733 | 4046 | 4443 |
| AUGUST | 31.9 | 4.830 | 5.438 | 4429 | 4859 |
| SEPTEMBER | 26.1 | 4.080 | 4.155 | 3542 | 3621 |
| OCTOBER | 19.0 | 3.770 | 3.557 | 3290 | 3249 |
| NOVEMBER | 13.8 | 3.370 | 3.381 | 2786 | 2786 |
| DECEMBER | 8.2 | 2.930 | 2.983 | 2448 | 2463 |

METHOD AND APPARATUS FOR ESTIMATING GENERATED ENERGY OF SOLAR CELL

BACKGROUND OF THE INVENTION

1. Field of the Invention

The present invention relates to a method and apparatus for estimating the generated energy of a solar cell and, more particularly, to a method and apparatus for estimating the generated energy of an amorphous silicon solar cell.

2. Description of Related Art

A solar cell is affected by a change in weather such as solar radiation or temperature because of its nature and therefore generates power unstably. For this reason, in order to estimate generated energy depending on the set state of a solar cell, a simulation is conducted using solar radiation or temperature data. Especially in recent years, solar cells for general housing purposes have become popular. To design the necessary number of solar cell modules, generated energy at the site where the solar cells are set must be estimated.

A method of estimating generated energy is disclosed in "Guidebook for Design of Photovoltaic Power Generation System" (The OHM-Sha, Ltd.).

The basic formula for simulation of generated energy of a photovoltaic power generation system is obtained in the following way. Using a mean tilt solar radiation $I_{s1}$, an overall correction coefficient K and rated power R1 of a solar cell are input. The generated energy of the photovoltaic power generation system is calculated using equation (1):

$$P2 = I_{s1} \cdot K \cdot R1 \tag{1}$$

The overall correction coefficient K is rewritten using a temperature correction coefficient D1', a dust reduction correction coefficient D2, a power transmission loss correction coefficient D3, and an inverter correction coefficient D4:

$$K = D1' \cdot D2 \cdot D3 \cdot D4 \tag{2}$$

The temperature correction coefficient D1' in equation (2) is given by:

$$D1' = 1 + \alpha_{pmax} (Tcm - Ts) \tag{3}$$

where $\alpha_{pmax}$: −0.0037 (single-crystal solar cell)
−0.0044 (polycrystalline solar cell)
−0.0020 (amorphous silicon solar cell)

Tcm: mean monthly ambient temperature A1+15° C.

Ts: solar cell temperature under standard conditions=25° C.

The power transmission loss correction coefficient D3 is given by equation (4) using an array unbalance loss E1, a wiring loss E2, and a diode loss E3:

$$D3 = 1 - (E1 + E2 + E3) \tag{4}$$

Assume that the above basic formula for calculating each monthly generated energy of the photovoltaic power generation system is used to estimate generated energy in a given area. As the mean monthly ambient temperature in that area increases, the temperature correction coefficient D1' is corrected in the negative direction. For this reason, when an amorphous silicon solar cell is used, the generated energy is estimated to be smaller than the actually generated energy. Conversely, the temperature correction coefficient D1' is corrected in the positive direction as the mean ambient temperature decreases. For this reason, when an amorphous silicon solar cell is used, the generated energy is estimated to be larger than the actual power. In the present invention, "amorphous silicon" includes "micro-crystallized silicon".

FIG. 2 is a graph showing generated energy estimated by the above method (solid line 11) and actually generated energy (broken line 12) for each month. A solid line 13 indicates the mean monthly ambient temperature. In a season when the mean monthly ambient temperature is particularly high or low, the difference between the estimated generated energy and the actually generated energy becomes large.

As is known, the amorphous silicon solar cell exhibits an optical degradation phenomenon due to its nature: the initial performance immediately degrades after the manufacture due to long-time outdoor exposure and finally stabilizes. The optical degradation in performance is a reversible phenomenon so annealing by heat allows recovery of the initial performance. This is called annealing recovery.

The solar cell generates power outdoors under a solar ray. The solar cell absorbs not only the solar ray necessary for power generation but also light components which do not contribute to power generation. The light energy which does not contribute to power generation is converted into heat and increases the temperature of the solar cell module. Actually, the temperature of the solar cell module during power generation is 20° C. to 30° C. in winter when the mean monthly ambient temperature is 2° C. to 3° C., and sometimes exceeds 60° C. in summer when the mean monthly ambient temperature is 25° C. to 26° C. For this reason, as the ambient temperature or module temperature increases, the amorphous silicon solar cell recovers its performance by the above-described annealing recovery and generates more power. That is, the nature is reverse to that of a crystalline solar cell.

When the above-described basic formula for generated energy is used to estimate generated energy of a photovoltaic power generation system using an amorphous silicon solar cell, the temperature correction coefficient D1' is corrected in the negative direction as the mean monthly ambient temperature increases, and the generated energy is estimated to be small. As the mean monthly ambient temperature decreases, the temperature correction coefficient D1' is corrected in the positive direction, and the generated energy is estimated to be large. This increases the difference between the estimated generated energy and the actually generated energy for each month.

SUMMARY OF THE INVENTION

It is an object of the present invention to provide a power estimation apparatus and method of accurately estimating power to be generated by a solar cell or a photovoltaic power generation apparatus on the basis of its installation site.

In order to achieve the above object, according to an aspect of the present invention, there is provided a method of estimating generated energy of a solar cell comprising the steps of: obtaining a mean solar radiation and mean temperature at a solar cell installation site; calculating a correction coefficient on the basis of the mean ambient temperature; and estimating the generated energy from the obtained mean solar radiation and correction coefficient, and rated power of the solar cell, wherein the correction coefficient increases as the mean ambient temperature increases.

According to another aspect of the present invention, there is provided an apparatus for estimating generated energy of a solar cell comprising: obtaining means for obtaining a mean solar radiation and mean ambient temperature at a solar cell installation site; calculation means for calculating a correction coefficient on the basis of the mean ambient temperature; and estimation means for estimating the generated energy from the obtained mean solar radiation and correction coefficient, and rated power of the solar cell, wherein the correction coefficient increases as the mean ambient temperature increases.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6A is a graph showing generated energies estimated using the conventional formula and the formula of the present invention and actually measured energy in the first embodiment;

FIG. 6B is a table showing a mean monthly ambient temperature A1 and mean tilt surface solar radiation Isi for each month, which are used to estimate generated energy, actually measured solar radiation, generated energy calculation results, and actually measured energy;

FIG. 7A is a graph showing generated energies estimated using the conventional formula and the formula of the present invention and actually measured energy in the second embodiment;

FIG. 7B is a table showing a mean monthly ambient temperature A1 and mean tilt surface solar radiation $I_{s1}$ for each month, which are used to estimate generated energy, actually measured solar radiation, generated energy calculation results, and actually measured energy;

FIG. 8 is a graph showing the generated energy generation efficiency estimation result and actually measured value;

FIG. 9A is a graph showing generated energies estimated using the conventional formula and the formula of the present invention and actually measured energy in the third embodiment;

FIG. 9B is a table showing a mean monthly ambient temperature A1 and mean tilt surface solar radiation $I_{s1}$ for each month, which are used to estimate generated energy, generated energy calculation results, and actually measured energy;

FIG. 10 is a graph showing the result of a test for proving the relationship between the mean module temperature of an amorphous silicon solar cell and the energy rating factor (normalized efficiency);

FIG. 12B is a table showing a mean monthly module temperature B1 and mean tilt surface solar radiation $I_{s1}$ for each month, which are used to estimate generated energy, actually measured solar radiation, generated energy calculation results, and actually measured energy.

DESCRIPTION OF THE PREFERRED EMBODIMENTS

Preferred embodiments of a generated energy estimation apparatus of the present invention will be described below in detail with reference to the accompanying drawings.

A mean ambient temperature correction coefficient α is determined by an outdoor proof test. More specifically, the mean monthly ambient temperature at the test site is plotted along the ordinate, and the degree of matching between the actual power and the rated power, which is represented by equation (5), is plotted along the abscissa. The rated power means the rated output from the solar cell in standard test conditions.

$$\text{Energy rating factor} = \text{actually generated energy}/(R1 \times I_{s1}) \quad (5)$$

where actually generated energy [Wh]
R1: rated power of solar cell [W·m²/kW]
$I_{s1}$: accumulated solar radiation [kWh/m²]

Figure 3:
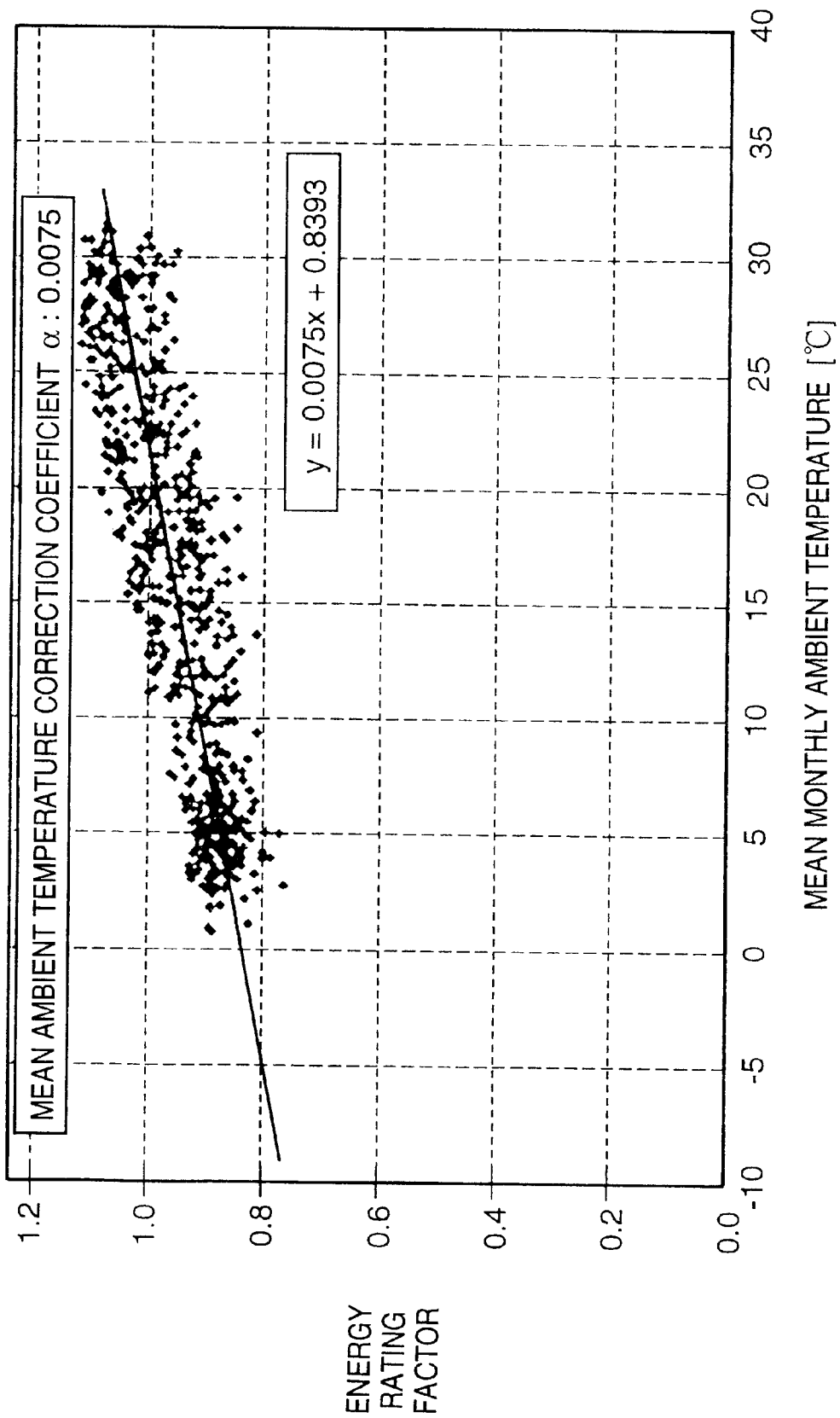
FIGS. 3 and 4 are graphs showing results of a test for proving the relationship between the mean monthly ambient temperature and the energy rating factor (normalized efficiency) for an amorphous silicon solar cell.

As shown in FIG. 3, the mean monthly ambient temperature and the energy rating factor (normalized efficiency) exhibit a linear relationship. The gradient is defined as the mean ambient temperature correction coefficient α. In an amorphous silicon solar cell, the mean ambient temperature correction coefficient α has a positive value.

The generated energy of a photovoltaic power generation system using an amorphous silicon solar cell in an area where the mean monthly ambient temperature is high is estimated using the mean ambient temperature correction coefficient α measured and calculated by the above method. In this case, as the mean monthly ambient temperature increases, a temperature correction coefficient D1 is corrected in the positive direction, so the generated energy can be accurately estimated.

Figure 5:
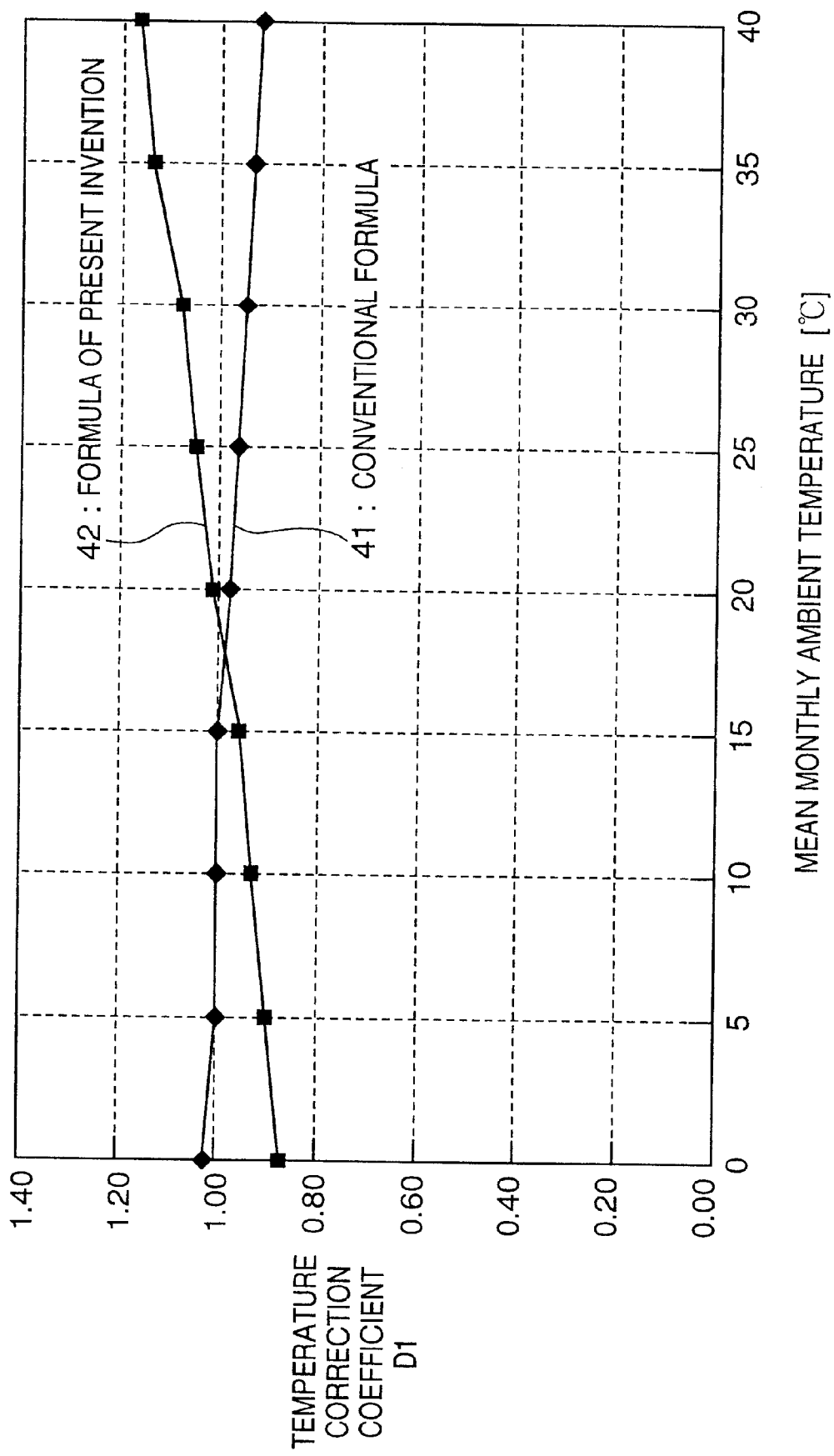
FIG. 5 is a graph showing the temperature correction coefficient D1 obtained by a formula of the present invention and the temperature correction coefficient D1' obtained by the conventional formula.

FIG. 5 is a graph showing a temperature correction coefficient D1' (solid line 41) using the conventional correction coefficient $\alpha_{pmax}=-0.0020$, and the temperature correction coefficient D1 (solid line 42) using the mean ambient temperature correction coefficient α measured and calculated by the above method. As is apparent from FIG. 5, as the mean ambient temperature increases, the temperature correction coefficient D1 using the mean ambient temperature correction coefficient α measured and calculated by the above method is corrected to increase. However, the temperature correction coefficient D1' using the conventional correction coefficient $\alpha_{pmax}$ is corrected to decrease.

Figure 1:
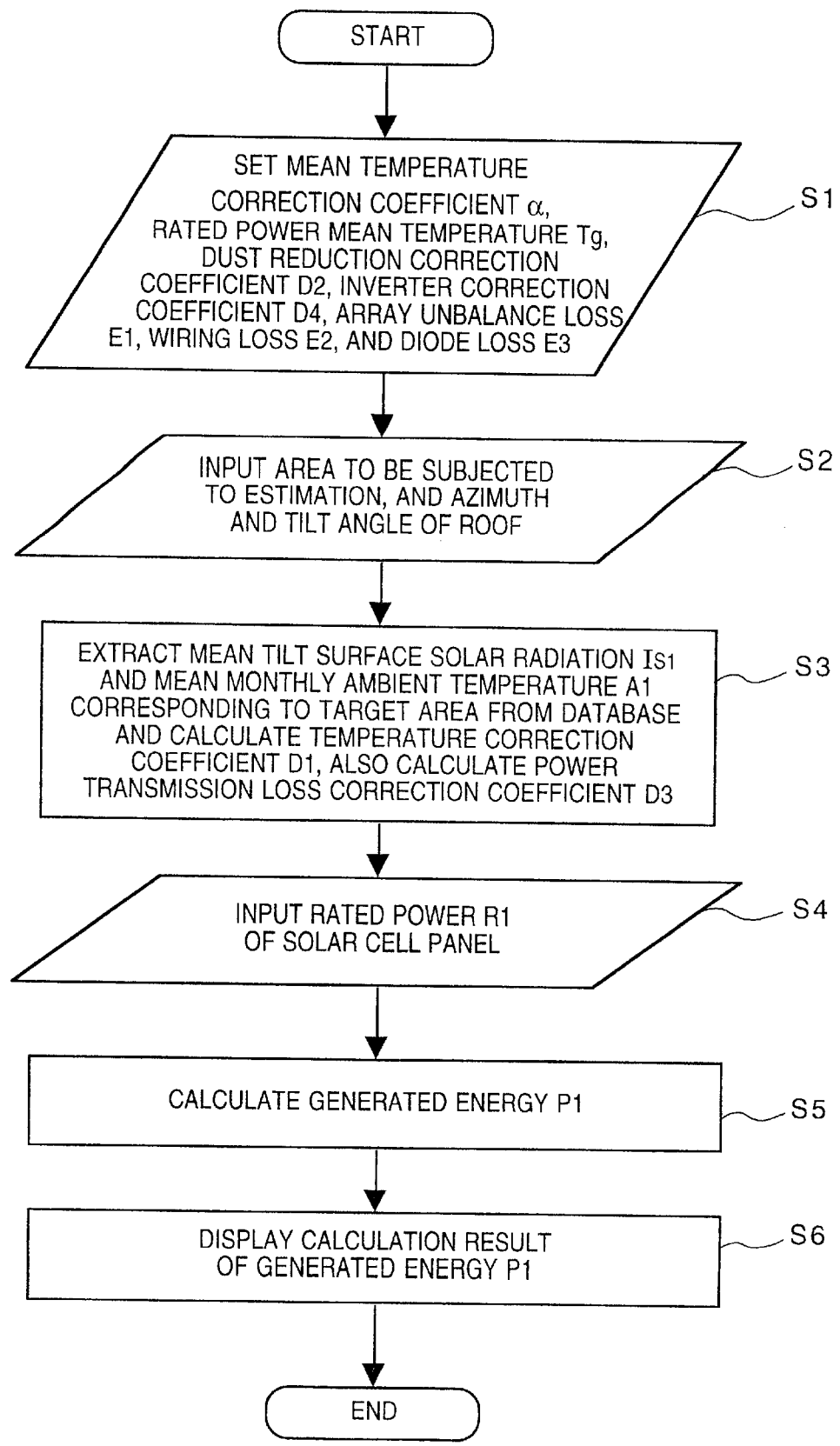
FIG. 1 is a flow chart showing processing of calculating the generated energy of a solar cell according to the present invention.
Figure 2:
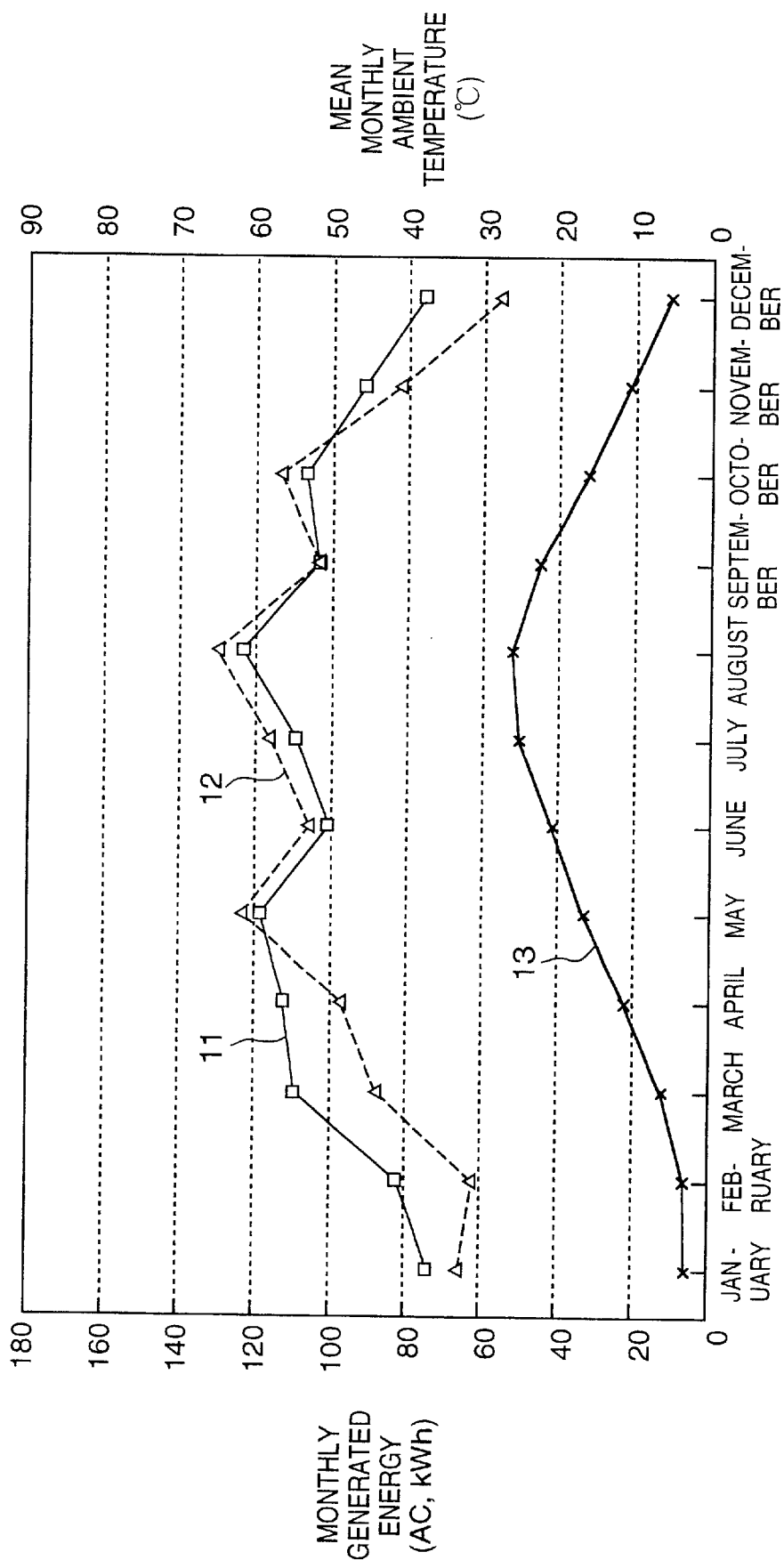
FIG. 2 is a graph showing comparison between generated energy estimated on the basis of a conventional formula and actually generated energy.

FIG. 1 is a flow chart showing an example of generated energy simulation according to the present invention. This processing is executed by, e.g., a personal computer to which a simulation program is supplied.

The mean temperature correction coefficient α calculated by the above method, a dust reduction correction coefficient D2, an inverter correction coefficient D4, an array unbalance loss E1, a diode loss E3, and a rated power mean ambient temperature Tg are set (step S1). The rated power mean ambient temperature Tg represents a mean monthly temperature at which the rated power R1 can be obtained.

Next, an area to be subjected to measurement, the tilt angle of the roof on which the solar cell is to be mounted, and the azimuth of the roof are input (step S2). A mean tilt surface solar radiation $I_{s1}$ and a mean monthly ambient temperature A1 are extracted on the basis of the input area, tilt angle, and azimuth. The temperature correction coefficient D1 and a power transmission loss correction coefficient D3 are calculated (step S3). Data of mean tilt surface solar radiation $I_{s1}$ and mean monthly ambient temperature A1 can be manually input. However, when these data are prepared as a database, the temperature correction coefficient D1 and the power transmission loss correction coefficient D3 can be calculated only by inputting the area, resulting in great convenience. If the database has no data corresponding to the input area, database of an area closest to the target area is selected.

After this, the rated power R1 of the solar cell to be used for the photovoltaic power generation system is input (step S4). Generated energy P1 in the area is calculated using the formula of the present invention (step S5), and the calculation result of the generated energy P1 is displayed (step S6).

As described above, in the present invention, the generated energy estimation formula (to be referred to as the "formula of the present invention" hereinafter) of the photovoltaic power generation system using the mean ambient temperature correction coefficient α which is measured and calculated by the above method is used to estimate generated energy of the photovoltaic power generation system assuming that the solar cell array is placed on flat ground. According to the formula of the present invention, when the mean monthly ambient temperature A1 is high, the temperature correction coefficient D1 is larger than 1. The behavior of the amorphous silicon solar cell can be modeled, including the annealing recovery in summer (high-temperature season) with high mean monthly ambient temperature, so the actually generated energy can be more accurately estimated. According to the conventional power estimation formula (to be referred to as the "conventional formula" hereinafter) for the photovoltaic power generation system using the temperature correction coefficient D1' based on the correction coefficient $\alpha_{pmax}$, generated energy in the high-temperature season is estimated to be smaller than the actual generated energy, and it seems that a larger number of solar cell modules are necessary. In the present invention, this waste can be eliminated.

As the solar cell, a cell formed by sequentially stacking a lower electrode, an amorphous semiconductor layer (including a micro-crystallized semiconductor), a transparent electrode, and a collector electrode on a substrate can be used. As the substrate, a metal such as stainless steel or a resin such as polyimide can be used. The lower electrode has a function of reflecting incident light and can be formed from aluminum, silver, or copper. The amorphous semiconductor layer has a semiconductor pin junction, and a plurality of pin junctions may be stacked. As the transparent electrode, ITO or the like is used. For the collector electrode, a conductive paste is printed, or a metal wire is fixed with a conductive paste. To obtain desired generated energy, a plurality of solar cells are connected in series/parallel.

These solar cells are encapsulated and sealed on a reinforcing plate of a metal or the like with a transparent resin. The reinforcing plate is bent to form a solar cell module or a roof integrated with the solar cells. Alternatively, the solar cells are arranged integrally with not the reinforcing plate but a transparent member of glass or a plastic to constitute a roofing member integrated with the solar cells. The generated energy of the solar cell module, and the roof or roofing member integrated with the solar cells is estimated on the basis of the formula of the present invention. The number of modules necessary for obtaining desired generated energy is determined, and the modules are installed as a solar panel.

First Embodiment

FIG. 3 is a graph plotting a mean monthly ambient temperature and an energy rating factor for a tandem solar cell module (UPM-880 available from United Solar Systems Co. (USSC)) having an amorphous silicon layer with two pin junctions. From the plotted points, the linear relationship between a mean monthly ambient temperature x and an energy rating factory is given by y=0.0075x+0.8393. A mean ambient temperature correction coefficient α corresponds to the gradient of this straight line: 0.0075. When the mean monthly ambient temperature x is 21.4° C., the energy rating factor y is 1. Therefore, a rated power mean ambient temperature Tg is 21.4° C.

A solar panel having a rated output of 1.2 kW, i.e., a standard solar cell array is installed on the roof of a house, and its generated energy is estimated under the following conditions using the mean ambient temperature correction coefficient a measured and calculated in the above manner.

(1) Installation site: Nagahama-shi, Shiga prefecture; directed due south, and the tilt angle of the roof is 33°.

(2) As the mean monthly ambient temperature, mean monthly ambient temperature data at Hikone-shi, Shiga prefecture published in "Chronology of Science" is referred to. As the solar radiation, mean monthly solar radiation data at Hikone-shi, Shiga prefecture, which is published by Japan Weather Association, is referred to.

(3) Solar cell array: 56 UPM-880 amorphous silicon solar cell modules available from USSC are used. Rated output=22 W, maximum output operating voltage=15.6 V, and effective area=3622 $cm^2$ per module.

(4) The rated input voltage of the inverter is DC 200 V.

In correspondence with the rated input voltage of the inverter, DC 200 V, 14 solar cell modules each having a maximum output operating voltage of 15.6 V are connected in series (to be referred to as a "string" hereinafter). The rated output per string is 308 W, and the maximum output operating voltage is 218 V. To obtain a total output of 1.2 kW, four strings are connected in parallel. That is, the total number of solar cell modules is 56, and the rated power R1 is 1.23 $kW \cdot m^2/kW$.

Correction coefficients in the formula of the present invention are set as follows.

Mean ambient temperature correction coefficient α=0.0075

Rated power mean ambient temperature Tg=21.4° C.

Dust reduction correction coefficient D2=0.90

Inverter correction coefficient D4=0.80

Array unbalance loss E1=0.0021

Wiring loss E2=0.015

Diode loss E3=0.005

That is, the formula of the present invention can be written as follows.

$$\text{Overall correction coefficient } K=\{1+\alpha(A1-Tg)\} \cdot D2 \cdot D3 \cdot D4 =\{1+0.0075 \cdot (A1-21.4)\} \cdot 0.704 \quad (6)$$

$$\text{Estimated generated energy } P1=I_{s1} \cdot K \cdot R1=I_{s1} \cdot K \cdot 1.232 \text{ [kWh/day]} \quad (7)$$

FIG. 6A shows the generated energy calculation results obtained using the conventional formula and the formula of the present invention under the above set conditions and actually generated energy of the photovoltaic power generation system for each month. FIG. 6B shows the mean monthly ambient temperature A1 and mean tilt surface solar radiation $I_{s1}$ for each month, which are used for calculation, the actually measured solar radiation, the generated energy calculation results, and the actually measured energy.

In FIG. 6A, a thin solid line 61 indicates the calculation result based on the conventional formula; a thick solid line 62, the calculation result based on the formula of the present invention; and a broken line 63, the actual measurement result. The calculation result according to the present invention has an error smaller than that of the conventional formula throughout the year. More specifically, a calculation error of the present invention is given by:

$$\epsilon = \Sigma\{(\text{actually measured energy} - \text{calculated generated energy})^2\}^{1/2}/12 \quad (8)$$

The error $\epsilon$ using the conventional formula is 10.6 throughout the year. The error $\epsilon$ using the formula of the present invention is as small as 5.7.

As shown in FIG. 6A, when the conventional formula is used, generated energy is estimated to be small in summer with high mean monthly ambient temperature and to be large in winter with low mean monthly ambient temperature. On the other hand, according to the formula of the present invention, conversely, as the mean monthly ambient temperature is higher, generated energy is estimated to be larger. The estimation result indicated by the thick solid line 62 in FIG. 6A has a behavior like the actually generated energy (broken line 63).

In this embodiment, as the mean solar radiation, the mean tilt surface solar radiation $I_{s1}$ is directly loaded from the database. However, when known direct/diffuse solar radiation separation is used, the solar radiation can be obtained by calculation based on a mean horizontal surface solar radiation $I_{H1}$.

Second Embodiment

Figure 4:
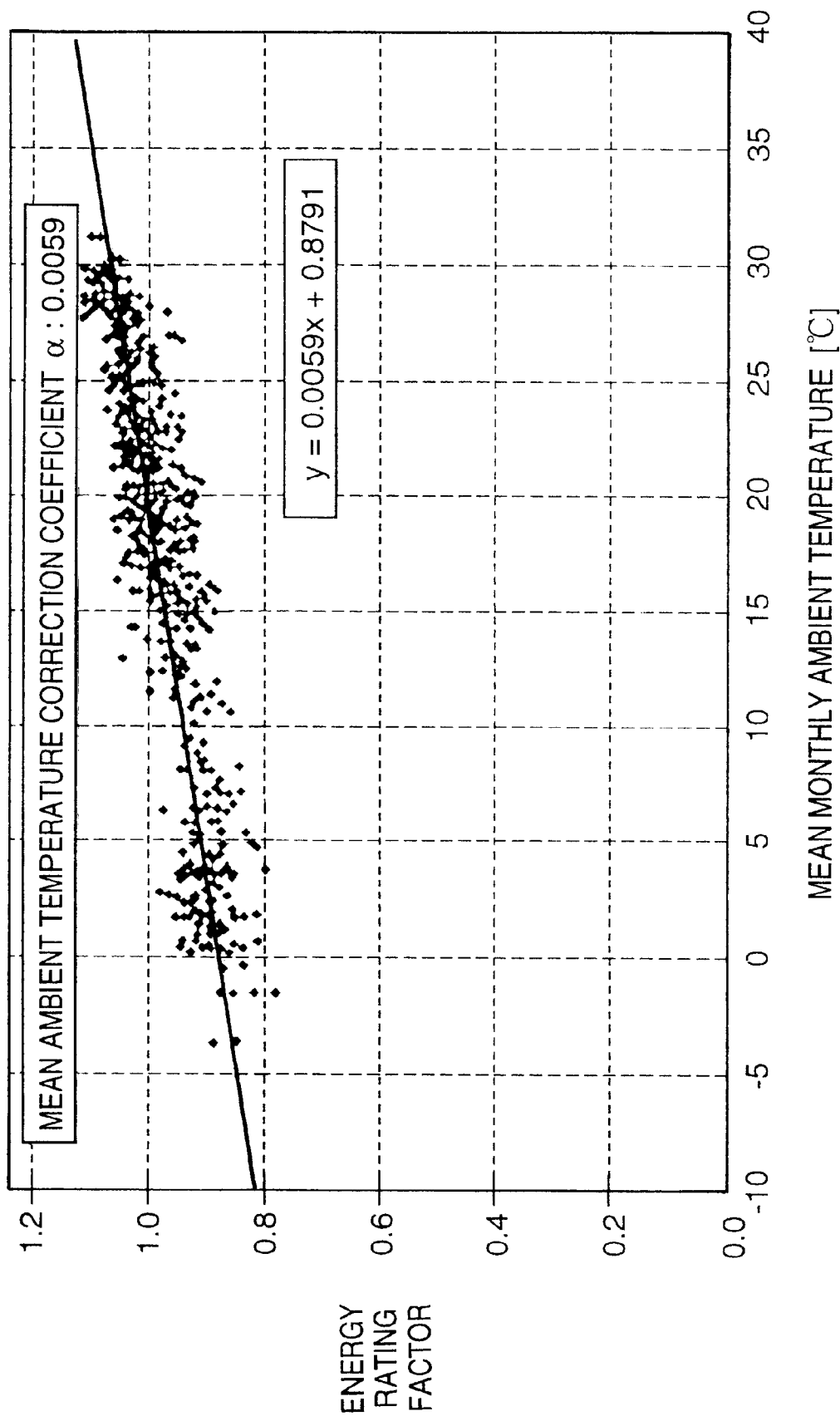

FIG. 4 is a graph plotting the relationship between a mean monthly ambient temperature x and a degree of matching y using a triple solar cell (equivalent to BS-04 available from CANON INC.) having an amorphous silicon layer with three pin junctions. From the plotted points, the linear relationship between the mean monthly ambient temperature x and the energy rating factor y is given by y=0.0059x+0.8791. A mean ambient temperature correction coefficient α corresponds to the gradient of the regression line: 0.0059. When the mean monthly ambient temperature is 20.5° C., the energy rating factor is 1. Therefore, a rated power mean ambient temperature Tg is 20.5° C.

Assume that one solar cell module is installed on flat ground. Generated energy of this solar cell module is estimated using the formula of the present invention. The following conditions are used for calculation.

(1) Installation site: Miyako-gun, Okinawa prefecture; directed due south, and the set tilt angle is 20°.
(2) As the mean monthly ambient temperature, mean monthly ambient temperature data at Naha-shi, Okinawa prefecture published in "Chronology of Science" is referred to. As the solar radiation, mean monthly solar radiation data at Naha-shi, Okinawa prefecture, which is published by Japan Weather Association, is referred to.
(3) Solar cell module: an amorphous silicon solar cell module equivalent to BS-04 available from CANON INC. is used. Rated output=31 W, maximum output operating voltage=7.0 V, and effective area=1400×420 mm.

Correction coefficients in the formula of the present invention are set as follows.

Mean ambient temperature correction coefficient α=0.0059
Rated power mean ambient temperature Tg=20.5° C.
Dust reduction correction coefficient D2=0.95
Power transmission loss correction coefficient D3=1.0
Inverter correction coefficient D4=1.0

In this embodiment, the generated energy of only one solar cell module is estimated. For this reason, both the power transmission loss correction coefficient D3 and the inverter correction coefficient D4 are set at 1.0.

That is, the formula of the present invention can be written as follows.

$$\text{Overall correction coefficient } K = \{1+\alpha(A1-Tg)\} \cdot D2 \cdot D3 \cdot D4 = \{1+0.0059(A1-20.5)\} \cdot 0.95 \quad (9)$$

$$\text{Estimated generated energy } P1 = I_{s1} \cdot K \cdot R1 = I_{s1} \cdot K \cdot 31 \text{ [Wh/day]} \quad (10)$$

FIG. 7A shows the generated energy calculation results obtained using the conventional formula (thin solid line 71) and the formula of the present invention (thick solid line 72) under the above set conditions and actually generated energy (broken line 73) of the solar cell module for each month. FIG. 7B shows the mean monthly ambient temperature and mean tilt surface solar radiation for each month, which are used for calculation, the actually measured solar radiation, the generated energy calculation results, and the actually measured energy.

As is apparent from FIG. 7A, when the conventional formula is used, generated energy is estimated to be small in summer with high mean monthly ambient temperature and to be large in winter with low mean monthly ambient temperature. On the other hand, according to the formula of the present invention, as the mean monthly ambient temperature increases, generated energy is estimated to be larger. The estimation result indicated by the thick solid line 72 in FIG. 7A has a behavior like the actually generated energy (broken line 73).

FIG. 8 is a graph showing results of calculation of the power generation efficiency. FIG. 8 shows the power generation efficiency calculated from the generated energies obtained by the conventional formula (thin solid line 81) and the power generation efficiency calculated from the generated energy obtained by the formula of the present invention (thick solid line 82), which are compared with the power generation efficiency calculated from actually measured data (broken line 83). As is apparent from FIG. 8, the power generation efficiency estimated on the basis of the formula of the present invention (thick solid line 82) almost agrees with that obtained from actually measured data (broken line 83). The power generation efficiency is calculated using the effective area of the solar cell as 4,031.5 cm².

As described above, even in an area with weather conditions different from those in the first embodiment, the generated energy can be accurately estimated using the formula of the present invention.

Third Embodiment

In this embodiment, assuming that a photovoltaic power generation apparatus including a solar cell panel and an inverter is installed on an average house, the generated energy of the photovoltaic power generation apparatus is estimated using the formula of the present invention.

Assume that a solar cell panel having a rated output of 1.56 kW, i.e., a standard solar cell panel, is installed. The following conditions are used.

(1) Installation site: Ichikawa-shi, Chiba prefecture; directed west 20° from south, and the tilt angle of the roof is 26.5°.
(2) As the mean monthly ambient temperature, mean monthly ambient temperature data at Tokyo published in "Chronology of Science" is referred to. As the solar radiation, mean monthly solar radiation data at Tokyo, which is published by Japan Weather Association, is referred to.

(3) Solar cell array: thirteen amorphous silicon solar cell modules equivalent to BS-03 available from CANON INC. are connected in series to form a string, and two strings are parallelly arranged and used. Rated output=60 W, maximum output operating voltage=14 V, and effective area=10920 cm².

(4) Inverter; SI-02 available from CANON INC.

Correction coefficients in the formula of the present invention are set as follows.

Mean ambient temperature correction coefficient $\alpha=0.0059$

Rated power mean ambient temperature Tg=20.5° C.

Dust reduction correction coefficient D2=0.95

Inverter correction coefficient D4=0.92

Array unbalance loss E1=0.0021

Wiring loss E2=0.015

Diode loss E3=0.005

That is, the formula of the present invention can be written as follows.

$$\text{Overall correction coefficient } K=\{1+\alpha(A1-Tg)\}\cdot D2\cdot D3\cdot D4 =\{1+0.0059\cdot(A1-20.5)\}\cdot 0.855 \quad (11)$$

$$\text{Estimated generated energy } P1=I_{s1\cdot K\cdot R}1=I_{s1}\cdot K\cdot 1.56 \text{ [kWh/day]} \quad (12)$$

FIG. 9A shows the calculation results obtained by estimating the generated energies of the photovoltaic power generation apparatus using the conventional formula (thin solid line 91) and the formula of the present invention (thick solid line 92) under the above set conditions and actually generated energy (broken line 73) for each month. FIG. 9B shows the mean monthly ambient temperature A1 and mean tilt surface solar radiation $I_{s1}$ for each month, which are used for calculation, the generated energy calculation results, and the actually measured energy.

As is apparent from FIG. 9A, when the conventional formula is used, generated energy is estimated to be small in summer with high mean monthly ambient temperature and to be large in winter with low mean monthly ambient temperature. On the other hand, according to the formula of the present invention, as the mean monthly ambient temperature increases, generated energy is estimated to be larger. The estimation result indicated by the thick solid line 92 in FIG. 9A has a behavior like the actual generated energy (broken line 93).

Fourth Embodiment

FIG. 10 is a graph plotting the relationship between a mean monthly module temperature x and an energy rating factor y for a triple solar cell (equivalent to BS-04 available from Canon) having an amorphous silicon layer with three pin junctions. From the plotted points, the regression line representing the relationship between the mean monthly module temperature x and the energy rating factor y is given by y=0.0039x+0.9136. A mean module temperature correction coefficient $\beta$ corresponding to the mean ambient temperature correction coefficient $\alpha$ corresponds to the gradient of the regression line: 0.0039. When the mean monthly module temperature is 22.2° C., the energy rating factor is 1. Therefore, a rated power mean monthly module temperature Tm is 22.2° C.

Assume that one solar cell module is installed on flat ground. The generated energy of this solar cell module is estimated using the formula of the present invention. This estimation is made on the basis of the flow chart shown in FIG. 11 using the actually measured value of the mean monthly module temperature of the solar cell module.

The following conditions are used for calculation.

(1) Installation site: on iron angle frame at Canon Inc. Ecology R & D center in Kizu-cho, Souraku-gun, Kyoto-prefecture; directed due south; and the tilt angle is 28.6°.

(2) As the mean monthly module temperature, a mean monthly value obtained from actually measured data of the temperature of the back surface of the solar cell module at the installation site is used.

(3) As the solar radiation, mean monthly tilt surface solar radiation data at Nara-shi, Nara prefecture, adjacent to Souraku-gun, Kyoto-prefecture, which is published by Japan Weather Association, is used.

(4) Solar cell module: an amorphous silicon solar cell module equivalent to BS-04 available from CANON INC. is used. Rated output=30 W, maximum output operating voltage=7.0 V, and effective area=1400×420 mm. Correction coefficients in the formula of the present invention are set as follows.

Mean module temperature correction coefficient $\beta=0.0039$

Rated power mean module temperature Tm=22.2° C.

Dust reduction correction coefficient D2=0.95

Power transmission loss correction coefficient D3=1.0

Inverter correction coefficient D4=1.0

In this embodiment, generated energy of only one solar cell module is estimated. For this reason, both the power transmission loss correction coefficient D3 and the inverter correction coefficient D4 are set at 1.0.

That is, the formula of the present invention can be written as follows.

$$\text{Overall correction coefficient } K=\{1+\beta\ (B1-Tm)\}\cdot D2\cdot D3\cdot D4 =\{1+0.0039\cdot(B1-22.2)\}\cdot 0.95 \quad (13)$$

$$\text{Estimated generated energy } P1=I_{s1}\cdot K\cdot R1=I_{s1}\cdot K\cdot 30 \text{ [Wh/day]} \quad (14)$$

Figure 12A:
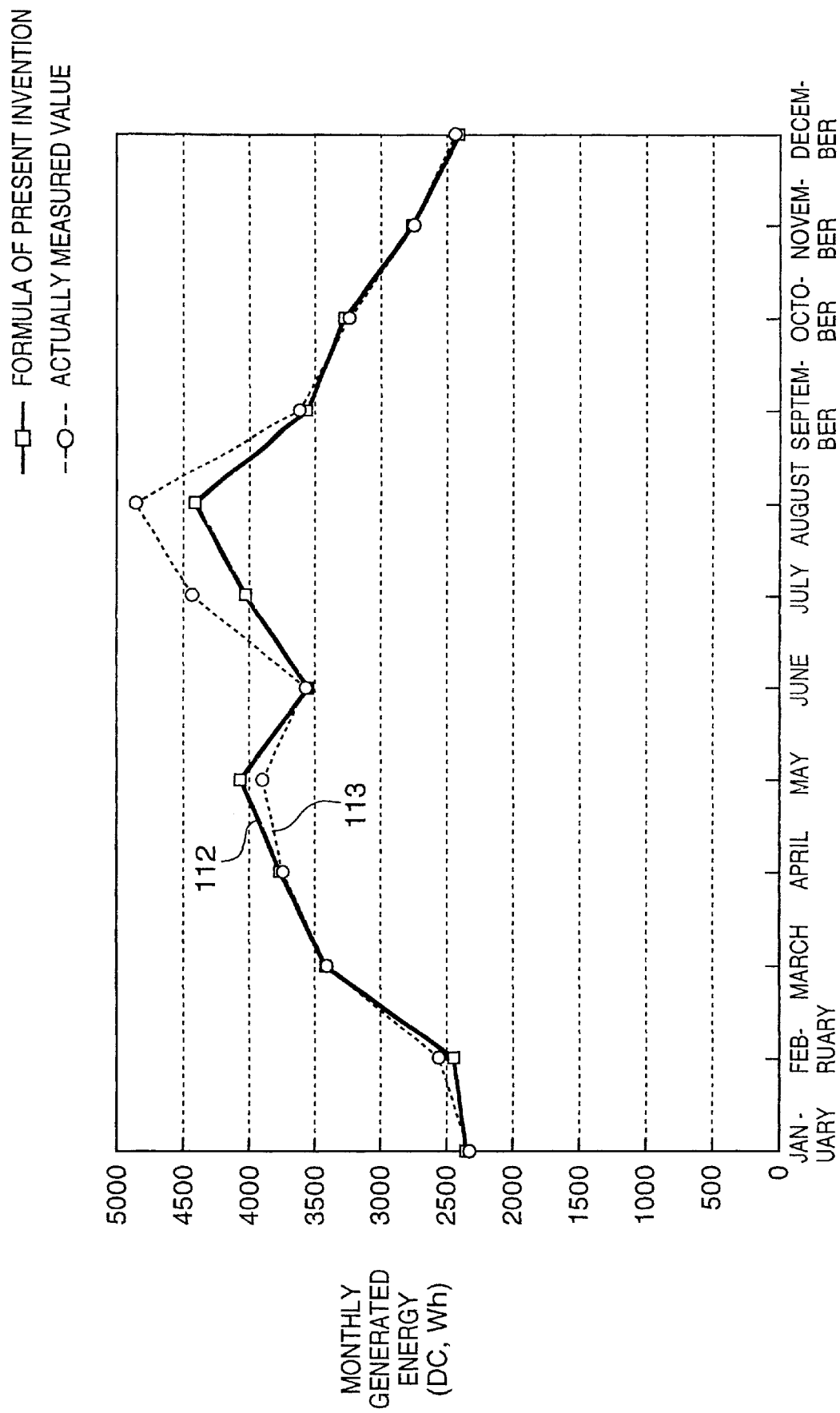
FIG. 12A is a graph showing generated energy estimated using the formula of the present invention and actually measured energy in the fourth embodiment.

FIG. 12A shows the calculation results obtained by estimating the generated energy of the solar cell module using the formula of the present invention (thick solid line 112) under the above set conditions and actually generated energy (broken line 113) for each month. FIG. 12B shows the mean monthly module temperature and mean tilt surface solar radiation for each month, which are used for calculation, the actually measured solar radiation, the generated energy calculation result, and the actually measured energy.

In FIG. 12A, according to the formula of the present invention, as the mean monthly module temperature increases, generated energy is estimated to be larger. The estimation result indicated by the thick solid line 112 in FIG. 12A has a behavior like the actually generated energy (broken line 113).

According to the above-described embodiments, when an amorphous silicon solar cell is used, the mean ambient temperature correction coefficient $\alpha$ in the formula of the temperature correction coefficient, i.e., $D1=\alpha(A1-Tg)$ is set to be a positive value. With this arrangement, the generated energy of the amorphous silicon solar cell can be accurately and properly estimated from the mean monthly ambient temperature. Therefore, a design method more adaptable to the amorphous silicon solar cell can be provided as a solar cell panel design method in installing a solar cell panel on a house or the like.

Figure 11:
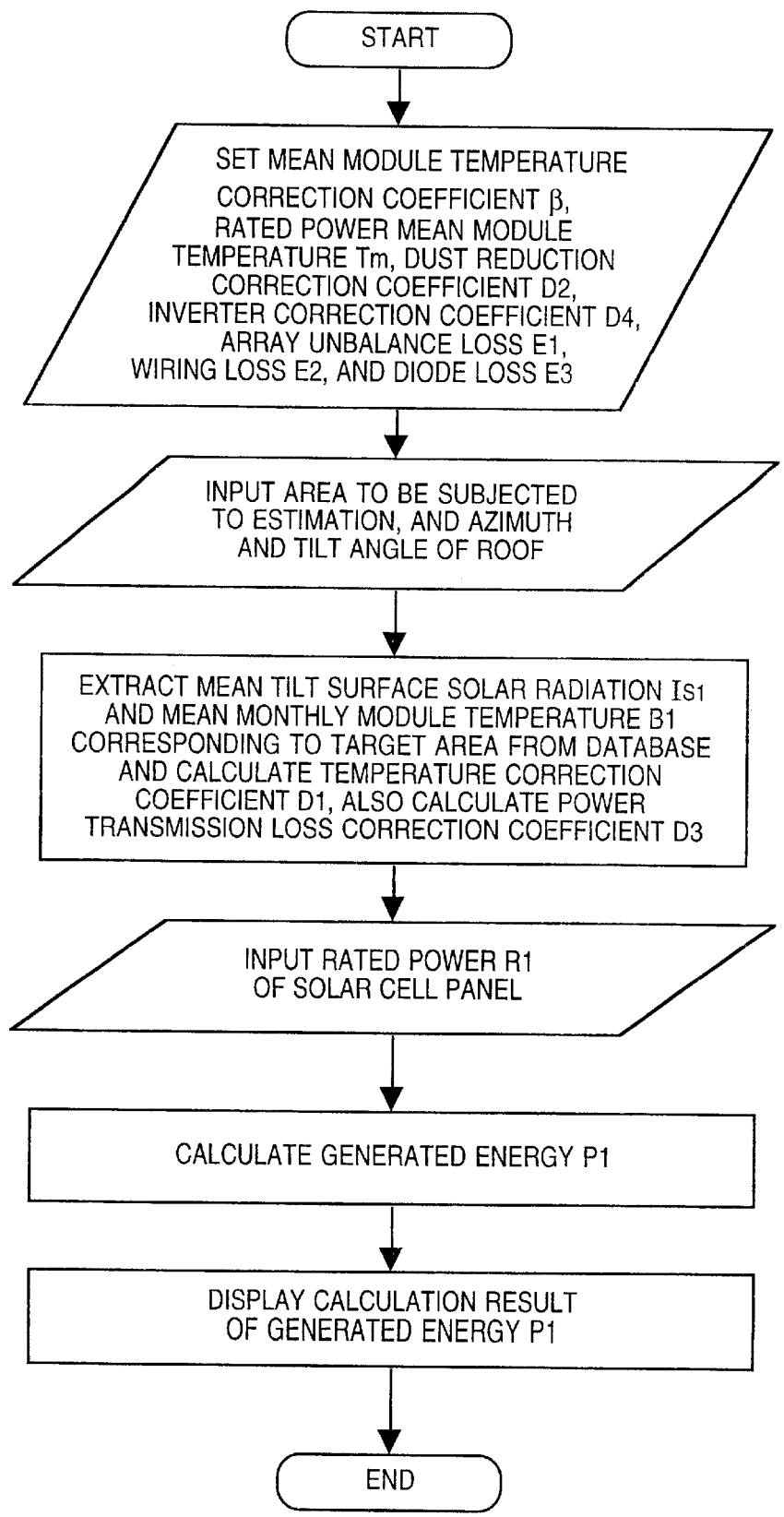
FIG. 11 is a flow chart showing processing of calculating generated energy of a solar cell module according to the present invention.

The photovoltaic power generation apparatus design method of the present invention is provided as data and a program for realizing processing and calculation of the flow charts shown in FIGS. 1 and 11, as is apparent. The program and dataconstitute the present invention. When the photovoltaic power generation apparatus is designed or installed using a computer, the program and data are recorded on a magnetic recording medium or optical recording medium to be used by the computer or provided through a communication medium. It is obvious to a person skilled in the art that, in the flow charts shown in FIGS. 1 and 11, instead of directly inputting the mean ambient temperature correction coefficient a and the rated power mean ambient temperature Tg, or the mean module temperature correction coefficient β and the rated power mean module temperature Tm, the model name or the solar cell module number may be input such that the coefficients corresponding to the solar cell module are obtained from the model name or number.

As many apparently widely different embodiments of the present invention can be made without departing from the spirit and scope thereof, it is to be understood that the invention is not limited to the specific embodiments thereof except as defined in the appended claims.

What is claimed is:

1. A method of estimating generated energy of a solar cell comprising the steps of:
    obtaining a mean solar radiation and mean ambient temperature at a solar cell installation site;
    calculating a correction coefficient on the basis of the mean temperature; and
    estimating the generated energy from the obtained mean solar radiation and correction coefficient, and rated power of said solar cell,
    wherein the correction coefficient increases as the mean ambient temperature increases and the generated energy P is given by:

$$P=I1 \cdot K \cdot R1$$

where I1 is the mean solar radiation, K is the correction coefficient, and R1 is the rated power.

2. The method according to claim 1, wherein the correction coefficient K is given by:

$$K=\{1+\alpha((A1-Tg))\} \cdot D$$

where A1 is the mean ambient temperature, α is a correction coefficient associated with the mean ambient temperature A1, Tg is an ambient temperature at which the rated power R1 can be obtained, and D is other correction coefficients.

3. The method according to claim 2, wherein the correction coefficient α has a positive value.

4. The method according to claim 2, wherein the correction coefficient α falls within a range of 0.002 to 0.009.

5. The method according to claim 2, wherein the correction coefficient α is calculated from a relationship between a mean monthly ambient temperature and a photoelectric conversion efficiency of said solar cell.

6. The method according to claim 2, wherein the other correction coefficients D include at least a coefficient for correcting a loss due to the dust of said solar cell, a coefficient for correcting a loss due to power transmission, and a coefficient for correcting a loss in an inverter.

7. The method according to claim 1, wherein said solar cell comprises an amorphous silicon solar cell.

8. An apparatus for estimating generated energy of a solar cell comprising:
    obtaining means for obtaining a mean solar radiation and mean ambient temperature at a solar cell installation site;
    calculation means for calculating a correction coefficient on the basis of the mean ambient temperature; and
    estimation means for estimating the generated energy from the obtained mean solar radiation and correction coefficient, and rated power of said solar cell,
    wherein the correction coefficient increases as the mean ambient temperature increases and the generated energy P is given by:

$$P=I1 \cdot K \cdot R1$$

where I1 is the mean solar radiation, K is the correction coefficient, and R1 is the rated power.

9. The apparatus according to claim 8, further comprising storage means for storing a mean ambient temperature and monthly solar radiation for each area.

10. The apparatus according to claim 9, wherein said obtaining means reads out a mean ambient temperature and mean solar radiation for an area closest to the installation site from said storage means.

11. A computer program product comprising a computer readable medium having computer program code for estimating generated energy of a solar cell, said product comprising:
    obtaining process procedure code for obtaining a mean solar radiation and mean ambient temperature at a solar cell installation site;
    calculation process procedure code for calculating a correction coefficient on the basis of the mean ambient temperature; and
    estimation process procedure code for estimating the generated energy from the obtained mean solar radiation and correction coefficient, and rated power of said solar cell,
    wherein the correction coefficient increases as the mean ambient temperature increases and the generated energy P is given by:

$$P=I1 \cdot K \cdot R1$$

where I1 is the mean solar radiation, K is the correction coefficient, and R1 is the rated power.

12. A method of estimating generated energy of a solar cell module, comprising the steps of:
    obtaining a mean solar radiation at a solar cell module installation site and a mean temperature of said solar cell module;
    calculating a correction coefficient on the basis of the mean temperature; and
    estimating the generated energy from the obtained mean solar radiation and correction coefficient, and rated power of said solar cell module,
    wherein the correction coefficient increases as the mean module temperature increases and the generated energy P is given by:

$$P=I1 \cdot K \cdot R1$$

where I1 is the mean solar radiation, K is the correction coefficient, and R1 is the rated power.

13. The method according to claim 12, wherein the correction coefficient K is given by:

$$K=\{1+\beta(B1-Tm)\} \cdot D$$

where B1 is the mean module temperature, β is a correction coefficient associated with the mean module temperature B1, Tm is a module temperature at which the rated power R1 can be obtained, and D is other correction coefficients.

14. The method according to claim 13, wherein the correction coefficient β has a positive value.

15. The method according to claim 13, wherein the correction coefficient β falls within a range of 0.002 to 0.009.

16. The method according to claim 13, wherein the correction coefficient β is calculated from a relationship between a mean monthly module temperature and a photoelectric conversion efficiency of said solar cell module.

17. The method according to claim 13, wherein the other correction coefficients D include at least a coefficient for correcting a loss due to the dust of said solar cell module, a coefficient for correcting a loss due to power transmission, and a coefficient for correcting a loss in an inverter.

18. The method according to claim 12, wherein said solar cell module comprises an amorphous silicon solar cell.

19. An apparatus for estimating generated energy of a solar cell module comprising:

obtaining means for obtaining a mean solar radiation at a solar cell module installation site and a mean temperature of said solar cell module;

calculation means for calculating a correction coefficient on the basis of the mean temperature; and estimation means for estimating the generated energy from the obtained mean solar radiation and correction coefficient, and rated power of said solar cell module, wherein the correction coefficient increases as the mean module temperature increases and the generated energy P is given by:

$$P = I1 \cdot K \cdot R1$$

where I1 is the mean solar radiation, K is the correction coefficient, and R1 is the rated power.

20. The apparatus according to claim 19, further comprising storage means for storing a mean module temperature and mean solar radiation for each area.

21. The apparatus according to claim 20, wherein said obtaining means reads out a mean module temperature and mean solar radiation for an area closest to the installation site from said storage means.

22. A computer program product comprising a computer readable medium having computer program code for estimating generated energy of a solar cell module, said product comprising:

obtaining process procedure code for obtaining a mean solar radiation at a solar cell module installation site and a mean temperature of said solar cell module;

calculation process procedure code for calculating a correction coefficient on the basis of the mean temperature; and estimation process procedure code for estimating the generated energy from the obtained mean solar radiation and correction coefficient, and rated power of said solar cell module, wherein the correction coefficient increases as the mean module temperature increases and the generated energy P is given by:

$$P = I1 \cdot K \cdot R1$$

where I1 is the mean solar radiation, K is the correction coefficient, and R1 is the rated power.

* * * * *

UNITED STATES PATENT AND TRADEMARK OFFICE
CERTIFICATE OF CORRECTION

PATENT NO. : 6,278,954 B1
DATED : August 21, 2001
INVENTOR(S) : Chin Chou Lim et al.

It is certified that error appears in the above-identified patent and that said Letters Patent is hereby corrected as shown below:

Column 3,
Line 36, "Isi" should read -- $I_{s1}$ --.

Column 6,
Line 11, "factory" should read -- factor y --; and
Line 21, "coefficient a" should read -- coefficient $\alpha$ --.

Column 9,
Line 24, "P1=$I_{s1}$·K·R1=" should read -- P1=$I_{s1}$·K·R1= --.

Column 10,
Line 66, "dataconstitute" should read -- data constitute --.

Column 11,
Line 6, "coefficient a" should read -- coefficient $\alpha$ --; and
Line 38, "K={1+α((A1-Tg)}·D" should read -- K={1+α(A1-Tg)}·D --.

Signed and Sealed this

Thirtieth Day of April, 2002

*Attest:*

JAMES E. ROGAN
*Attesting Officer*        *Director of the United States Patent and Trademark Office*